United States Patent [19]
Agouri et al.

[11] 3,980,736
[45] Sept. 14, 1976

[54] HOMOGENEOUS POLYOLEFIN AND ARYLVINYL-POLYMER-BASED COMPOSITIONS

[75] Inventors: Elias Agouri, Pau; Raymond Catte, Billere; Jean-Louis Dauba, Pau, all of France

[73] Assignee: Societe Anonyme Ato Chimie, Paris, France

[22] Filed: Sept. 9, 1974

[21] Appl. No.: 504,149

Related U.S. Application Data

[62] Division of Ser. No. 211,667, Dec. 23, 1971, Pat. No. 3,894,117.

[52] U.S. Cl. .............................. 260/876 B; 215/200; 260/878 B; 260/897 A; 260/897 B
[51] Int. Cl.² ............................................. C08L 51/00
[58] Field of Search ..................... 260/876 B, 878 B

[56] References Cited
UNITED STATES PATENTS

| | | | |
|---|---|---|---|
| 3,189,665 | 6/1965 | Nozaki | 260/878 B |
| 3,287,443 | 11/1966 | Saito | 260/876 R |
| 3,298,853 | 1/1967 | Helin et al. | 260/879 |
| 3,358,053 | 12/1967 | Hostetler | 260/878 B |
| 3,424,649 | 1/1969 | Nyberg et al. | 260/876 B |
| 3,458,598 | 7/1969 | Craven | 260/878 B |
| 3,478,129 | 11/1969 | Kern et al. | 260/878 B |
| 3,522,036 | 7/1970 | Vest et al. | 260/878 B |

Primary Examiner—J. Ziegler
Attorney, Agent, or Firm—Ostrolenk, Faber, Gerb & Soffen

[57] ABSTRACT

This invention concerns a process for obtaining homogeneous polymer compositions containing at least one olefin polymer and/or one arylvinyl polymer.

The process consists of adding, to either or to a mixture of both of these polymers, one or more block copolymers, containing one polyolefin and one polyarylvinyl sequence.

These polymer compositions provide homogeneous substances with properties combining those of the individual polymers, and in some mixtures these properties are considerably improved as the result of synergic phenomena.

5 Claims, No Drawings

HOMOGENEOUS POLYOLEFIN AND ARYLVINYL-POLYMER-BASED COMPOSITIONS

This is a division of application Ser. No. 211,667 filed on Dec. 23, 1971, now U.S. Pat. No. 3,894,117.

This invention concerns a process for preparing homogeneous polymer compositions containing at least one polymer from the olefin and arylvinyl group, and in particular a mixture of an olefin polymer, such as polyethylene or polypropylene, with an arylvinyl polymer, such as polystyrene. It also concerns the polymer compositions obtained by this process.

There is an obvious advantage in substances which combine the properties of polyolefins with certain properties of polystyrene, particularly its rigidity and suitability as a printing base.

However, because of the incompatibility of polyolefins and polystyrene, composites of these polymers are heterogeneous in structure and mechanically weak, so that it is little use preparing them.

Research has now revealed a process for obtaining, among other things, homogeneous mixtures of polyolefins and polystyrene.

The process according to the invention, for the preparation of homogeneous polymer compositions containing at least one polymer from the olefin and arylvinyl group, is characterized by the fact that the polymer is mixed intimately with one or more block copolymers containing one polyolefin and one polyarylvinyl sequence.

In one embodiment of the invention, at least one of the block copolymers includes a sequence formed from the polymer to which it is added.

In another embodiment of the invention, the block copolymer or copolymers are added to a mixture of an olefin polymer and arylvinyl polymer, and each contains one sequence formed from the olefin polymer and another sequence formed from the arylvinyl polymer.

The block copolymers used in the invention can be obtained by first polymerizing an olefin in the presence of dialkyl-zinc and co-ordinating catalysts and then polymerizing the arylvinyl monomer, using a radical-type catalyst, in the presence of the non-deactivated polymer produced during the first stage.

In one embodiment of the invention, the block copolymer is added by being mixed in a molten state with one of the polymers, after which the remaining polymer or polymers are added to this mixture.

In another embodiment of the invention, the block copolymers are added to the polymer or a mixture of polymers by being mixed in a molten state.

In a recommended embodiment of the invention, the block copolymer or copolymers are added to the mixture of polymers by being mixed in a molten state, under temperature and shearing conditions at which the polymers have similar viscosities.

In another embodiment of the invention, the block polymer is added to a mixture of from 50 to 100 % of one polymer and from 50 to 0 % of another polymer.

In another embodiment of the invention, between 1 and 400, and preferably 5 and 200, parts of block copolymer are added to 100 parts of polymer or mixture of polymers.

In another embodiment of the invention, the olefin polymers are one or more substances such as high-density polyethylene, low-density polyethylene, polypropylene, polybutene, polymethylpentene, ethylene/propylene block copolymers, polyallomers, and olefin and vinyl monomer copolymers, such as ethylene/vinyl-acetate copolymers.

In another embodiment of the invention, the arylvinyl polymers are one or more polymers obtained by polymerizing or copolymerizing styrene or styrene derivatives.

In another embodiment of the invention, the polymers consist of polyethylene and polystyrene, and the block copolymer is formed from one sequence of each of them.

In another embodiment of the invention, substances such as fillers, stabilizers, plasticizers, organic or inorganic pigments, opaquing agents, or even another polymer, are added to the polymer or mixture of polymers before or after the block copolymer is added.

In another embodiment of the invention, the block polymer is added in a molten state, using a screw mixer, internal mixer or stirrer reactor.

In another embodiment of the invention, the block copolymer is added by mixing dry powders or granules of the polymer or polymers and of the block copolymer.

In another embodiment of the invention, the block copolymer is added to the polymer or polymers in solution.

This invention also concerns the homogeneous polymer compositions obtained by this process.

It also concerns films, plates, flat or corrugated sheets, sheaths, pipes, bottles and other manufactured articles obtained from these polymer compositions.

Other aims and benefits will appear from the following examples of various embodiments of the invention, which, however, is not confined to them.

To simplify matters, polyethylene will be referred to below as PE, and polystyrene as PS. In most cases, the exact trade names of these substances are given in brackets. Manolene 6001 is a high-density PE with a density of 0.96 and melt index of 0.1, and Lacqtene 1020 is a low-density PE with a density of 0.92 and melt index of 2. Lacqrenes are crystal PEs marketed by the applicant's assignee. Polymer compositions according to the invention may be used to manufacture extruded sheaths (thin films or sheets to replace paper, corrugated sheets to replace cardboard) or hollow tubing (pipes or cables), or heat-shaped or injected articles (bottles).

For example, PE/PS/block PE.PS compositions in the form of thin sheets can usefully replace paper, since the very fine dispersion of PS in the PE matrix gives the material touch, printing, tear-strength, flexibility and welding properties lacking in composites that do not contain any block copolymer.

Sheets of excellent quality for printing work can be obtained from composites containing 5 to 30 weight percent of block copolymers, 2 to 40 % PS, and the rest PE, and possibly including titanium oxide, without any preliminary treatment.

Composites with a higher block copolymer content, and particularly low density polyethylene containing 20 to 50 weight percent of block copolymers, can be used to make articles such as bottles and pipes, which have great rigidity, not unlike that of high-density polyethylene. Composites containing these block copolymers are also found to congeal more quickly when molten than polyethylene, so that extrusion, injection and heat-shaping processes can be speeded up.

EXAMPLE 1

The products are mixed in a double-screw welding extruder, in which the screws rotate at a speed of 100 rpm. The mixing temperature is 200°C.

The extruded product is granulated and injected into a Battenfeld 10 VP.25 plasticizer screw-press.

Two mixtures are prepared. Mixture A contains 12.5 parts weight of PE (Manolene 6001), 12.5 parts crystal polystyrene (Lacqrene 506), and 75 parts PE/PS block copolymer with 20 % weight of PS.

Mixture B contains 72.5 parts weight of PE (Manolene 6001), and 27.5 parts PS (Lacqrene).

Table 1 below shows the mechanical properties of each of these polymer compositions.

Table 1

| Mixture | Yield point kg/sq.cm | Breaking elongation % | Impact tension kgcm/sq.cm | Dynstat bending kg/cm |
|---|---|---|---|---|
| A | 370 | 54 | 270 | 7.4 |
| B | 369 | 27 | 95 | 5.6 |

In addition, microphotographic examination, using hot-pressed cross-sections cut with a microtome, 15 $\mu$ thick, shows that the ternary mixture is much more homogeneous than the binary mixture.

EXAMPLE 2

Using the same technique as in example 1, two more mixtures are prepared, with the following compositions by weight:

Mixture C: 60 % PE (Lacqtene 1020); 17.7 % PS (Lacqrene 550); 22.3 % PE/PS block copolymer containing 17 % PS;

Mixture D: 60 % PE (Lacqtene 1020); 24 % PS (Lacqrene 550); 16 % PE (Manolene 6001).

In the case of mixture C, the block copolymer is first mixed with the PS, and the resulting mixture added to the PE.

Microscopic examination reveals the excellent dispersion of PS in mixture C, compared with mixture D (grains <3 $\mu$ for C, 10 to 100 $\mu$ for D).

The two mixtures were extruded into sheaths, with maximum encouragement of bi-orientation (width 50 to 55 cm; thickness 10/100ths mm).

Table 2 shows the properties of these sheaths.

Table 2

| Mixture | C | D |
|---|---|---|
| Surface feel | Soft | Rough |
| Dart-test in g[1] (ASTA D 1709.62T) | 38.5 | <15 |
| % breaking elongation[2] | 50 | 26 |
| Breaking strength in kg/sq.cm[3] | 160 | 160 |
| Welding properties | Good | Poor |
| Printing qualities | Good | Fair |

[1]For guidance, the dart-test result for a sheet of paper is 15 g.
[2]Measured parallel to direction of extrusion.
[3]The breaking strength in the ultimate strength in the zone of elasticity.

EXAMPLE 3

Using the technique described in example 2 for mixture C, four more mixtures are prepared. Table 3 shows the compositions of these mixtures by percentage weight.

Table 3

| Mixture | PE (Lacqtene 1020) | PS (Lacqrene 550) | PE/PS block copolymer with 17 % PS |
|---|---|---|---|
| E | 65 | 0 | 35 |
| F | 73 | 12 | 15 |
| G | 60 | 20 | 20 |
| H | 50 | 30 | 20 |

Microscopic examination shows the excellent dispersion of the PS in these mixtures.

The mixtures were extruded into sheaths 1/10 mm thick, with an expansion rate of 3.

Table 4 shows the properties of the sheaths.

The thin sheets obtained from these mixtures resemble paper, with regard to printing qualities and surface feel. In addition, the sheets obtained from mixture H have the same tearing and crumpling qualities as high-quality paper. No blocking occurred in any of the sheets.

Table 4

| Mixture | Dart-test in g | Breaking strength in kg/sq.cm | Breaking elongation %[1] | Welding properties | Appearance of sheets |
|---|---|---|---|---|---|
| E | 106 | 150 | 370 | Excellent | Very smooth |
| F | 60 | 130 | 295 | Excellent | Very smooth |
| G | 30 | 215 | 46 | Good | Soft |
| H | 20 | 325 | 60 | Good | Slightly rough |

[1]Measured parallel to direction of extrusion.

Each of these mixtures is extruded, using a die imitating the cross-section of corrugated cardboard. The resulting products have high compressive strength, weigh 400 to 650 g/sq.m depending on thickness, and show permanent deformation when folded.

Containers are also produced by extrusion-blowing, using a 6 cm-diameter die. The bottles obtained have good join-lines, satisfactory appearance, and high rigidity.

Test-samples produced from these mixtures show high surface-cracking strength, measured in accordance with ASTM standard D 1693. The Vicat temperatures are 100°C for mixture E, 91°C for F, 95°C for G and 97°C for H. (In comparison, the Vicat temperature of low-density polyethylene, measured under the same conditions, is 90°C.)

Tubing, measuring 6 × 8, is also extruded using mixture E. The tube has excellent rigidity, and a remarkably smooth appearance. Bursting strength at 20°C is at least twice that of polyethylene tubes produced under the same conditions.

In addition, all these composites are much easier to extrude, and can be drawn much faster.

EXAMPLE 4

Using the same mixing technique as for example 1, two more mixtures are prepared, mixture I, consisting of 99.4 % weight of ethylene/vinyl acetate copolymer with 5 % vinyl acetate, and 0.6 % PE/PS block copolymers with 20 % weight of PS, and mixture J, consisting of 99.7 % weight of the same ethylene/vinyl acetate copolymer as in mixture I, and 0.3 % silica gel, normally used as an agent to reduce post-extrusion blocking between sheaths made from ethylene polymers and copolymers.

The two mixtures, and the original ethylene/vinyl acetate copolymer (K), are extruded in sheaths approximately 50 cm wide and 0.05 mm thick, and tested.

Table 5 shows the results of these tests.

Table 5

| Composite | Haze %[1] | Blocking in g[2] | Dart-test in g. |
|---|---|---|---|
| I | 16 | 250 | 590 |
| J | 22 | 250 | 550 |
| K | 16.5 | 500 | 600 |

[1]ASTM method.
[2]Force in grams needed to detach two superimposed sheaths.

These results show that the addition of the PE/PS block copolymer to the ethylene/vinyl acetate copolymer considerably reduces post-extrusion blocking, while altering the optical and mechanical properties of the ethylene/vinyl acetate copolymer as little as possible.

Polyolefin/polyarylvinyl and particularly polyethylene/polystyrene block copolymers therefore act as an anti-blocking agent in olefin polymers such as polyethylene, or olefin copolymers such as ethylene/vinyl acetate copolymer, used to manufacture extruded sheaths and films.

When less than 10 weight percent of block copolymer is added to polyolefins or olefin copolymers, such as ethylene/vinyl acetate copolymer, the block copolymer confers considerable slipping power on the films and sheaths manufactured. In other words, the block copolymer can be used to replace the slip agent, such as fatty amide, normally used for this purpose.

Naturally, the invention is in no way confined to those examples: many alternative forms are possible, for someone skilled in the art, depending on the applications involved, without any departure from the spirit of the invention.

What is claimed is:

1. A homogeneous polymer composition comprising one member of the group consisting of monoolefin polymer and polystyrene, and at least one polymonoolefin-polystyrene block copolymer containing one polymonoolefin and one polystyrene sequence wherein said block copolymer is present in an amount of 0.6 % to 80 % based on the total weight of said block copolymer and said member of the group.

2. The homogeneous polymer composition of claim 1 wherein said group consists of polyethylene, polypropylene, polybutene, polymethylpentene, ethylene/propylene block copolymer, ethylene/vinyl acetate copolymer, and polystyrene.

3. The homogeneous polymer composition of claim 1 comprising low density polyethylene and 20 to 50 weight percent block copolymer.

4. The homogeneous polymer composition of claim 1 wherein the member of the group is an ethylene/vinyl acetate copolymer.

5. The homogeneous polymer composition of claim 1 wherein the amount of block copolymer is less than 10 weight percent.

* * * * *